United States Patent [19]
Aoki

[11] 3,806,296
[45] Apr. 23, 1974

[54] ROTARY TYPE INJECTION MOLDING MACHINE

[76] Inventor: Katashi Aoki, 6037 Oaza Minamijo, Sakaki-machi, Hanishina-gun, Nagano-ken, Japan

[22] Filed: Aug. 16, 1971

[21] Appl. No.: 171,914

[30] Foreign Application Priority Data
Aug. 29, 1970  Japan.............................. 45-75442
Aug. 29, 1970  Japan.............................. 45-75443

[52] U.S. Cl............................. 425/246, 425/451
[51] Int. Cl............................................. B29f 1/00
[58] Field of Search.................. 425/246, 150, 451

[56] References Cited
UNITED STATES PATENTS
| | | | |
|---|---|---|---|
| 3,621,533 | 11/1971 | Bertrandi | 425/246 X |
| 3,277,533 | 10/1966 | Meister et al. | 425/251 X |
| 3,574,894 | 4/1971 | Aoki | 425/246 |
| 3,025,567 | 3/1962 | Sherman | 425/246 X |
| 3,345,687 | 10/1967 | Marx | 425/246 |
| 3,334,380 | 8/1967 | DiSettembrini | 425/451 |

*Primary Examiner*—J. Spencer Overholser
*Assistant Examiner*—David S. Safran
*Attorney, Agent, or Firm*—David H. Semmes

[57] ABSTRACT

In a rotary type injection molding machine having a pair of rotatable plates supported on an shaft to be rotated therearound intermittently, a plurality of metal molds being disposed between said pair of rotatable plates in such a manner that each of the molds can be operated through an operating rod, an improvement wherein a pressurizing cylinder is provided for each of the plurality of metal molds, said cylinder having a piston integrally connected to said operating rod for the metal mold, a fluid circulating path being provided for each of the pressurizing cylinders, said fluid circulating path including at least one accumulator, a check valve, and transfer valve means whereby the metal molds are locked at a pressurized condition after the molds are closed by means of a mold closing device.

2 Claims, 14 Drawing Figures

KATASHI AOKI, INVENTOR

BY David N. Semmes

ATTORNEY

INVENTOR
KATASHI AOKI,
BY David H. Semmes
ATTORNEY

ROTARY TYPE INJECTION MOLDING MACHINE

This invention relates to a rotary type injection molding machine which is provided with a pressurized device for closing the metal molds by a hydraulic pressure.

A primary object of the present invention is to provide a rotary type injection molding machine provided with a pressurized device for maintaining the metal molds under a pressurized condition, wherein each of the mold operating rods connected to the movable dieplates of the injection molding machine is cooperated with a pressurizing cylinder provided with a fluid circuit including a plurality of accumulators, a piston included in the pressurizing cylinder being activated by an outside force together with the mold operating rod for closing the metal mold, and the thus closed metal mold being maintained at a pressurized condition under a pressure difference caused by the accumulators.

Another object of the present invention is to provide a rotary type injection molding mschine having a pressurized device for maintaining the metal molds under a pressurized condition, wherein the metal molds cannot be opened or closed without precluding the hydraulic resistance in the cylinders, and a metal mold once closed cannot be opened by the inner pressure and also by any outside force.

Still another object of the present invention is to provide a rotary type injection molding machine having a pressurized device for maintaining the metal molds under a pressurized condition, wherein means for reciprocally moving the metal molds intermittently is further provided.

The invention will be made apparent from the following description with respect to preferred embodiments thereof when read in conjunction with the accompanying drawing wherein like members are designated by like reference numerals.

Figure 1:
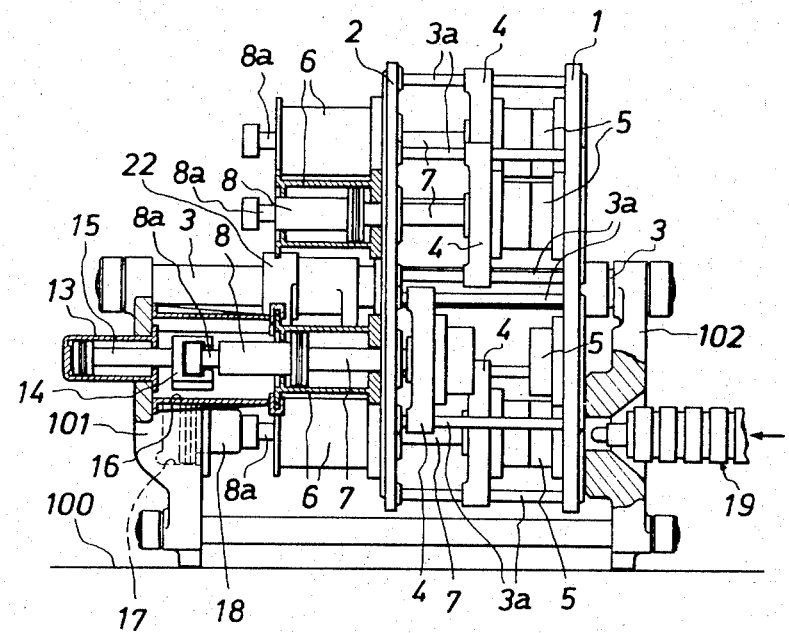
FIG. 1 is a profile view, partly in section, of a rotary type injection molding machine.

Referring now to FIG. 1 showing a rotary type injection molding machine according to the present invention, there is indicated that the injection molding machine comprises a base structure 100, stationary supporting members 101 and 102 fixedly mounted on the base structure, a central shaft 3 extended horizontally between the supporting members 101 and 102 and journaled through the supporting members and a pair of rotating plates 1 and 2 fixed perpendicularly to the central shaft 3. The pair of rotating plates 1 and 2 further interconnected therebetween by a predetermined number of tie-bars 3a which are disposed four in one set along the periphery of the rotating plates 1 and 2. On each set of the tie-bars 3a, a die plate 4 holding one half of the metal mold 5 is mounted so that the die plate 4 is freely slidable along the tie-bars 3a fore and after. Another half of the dividable metal mold 5 is fixed on the surface of the rotating plate 1 facing to the rotating plate 2, whereby the dividable metal mold 5 can be opened or closed by the retraction or progression of the die plate 4.

The rear side of the die plate 4 is directly coupled to an operating rod 7 for the die plate 4, which is extended backwardly through the rotating plate 2 and integrally connected with a piston 8 included in a pressurizing cylinder 6 fixedly mounted on the rearward surface of the rotating plate 2. This piston 8 is not designed to be moved by the pressurized fluid supplied into the cylinder tube, but is designed to be moved inside of the pressurizing cylinder 6 under an outwardly applied force onto the piston 8. For this reason, the rearwardly protruding end of the piston 8 out of the pressurizing cylinder 6 is formed into a neck 8a which can be conveniently coupled to another member for applying the outside force.

Figure 2:
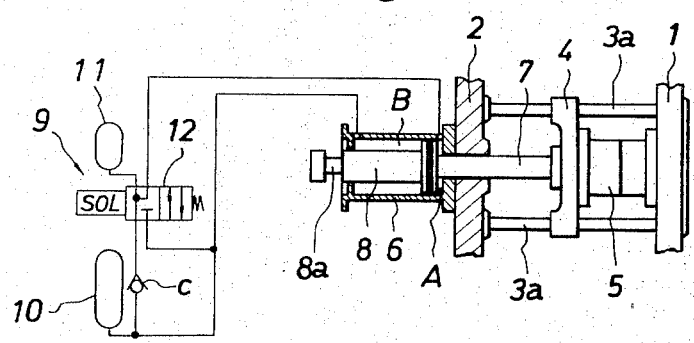
FIG. 2 is a profile view, partly in section, of a device for pressurizing the metal molds in the rotary type injection molding machine.
Figure 3:
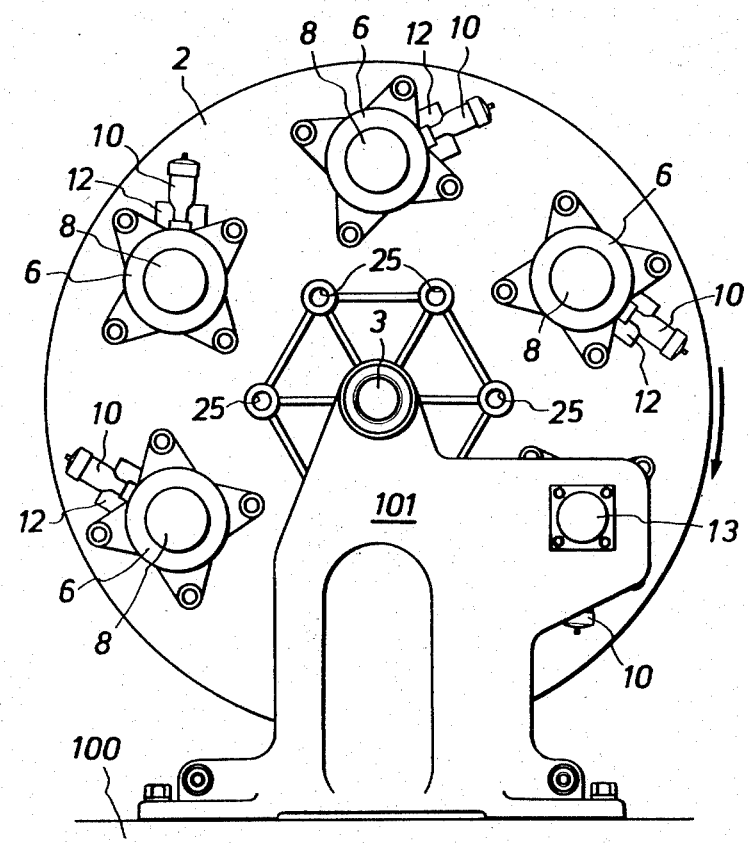
FIG. 3 is a rear side view of the rotary type injection molding machine.

On the pressurizing cylinder 6, a circulating path 9 of the pressurized fluid forced to flow by the piston 8 is provided as shown in FIG. 2. In the circulating path 9 connected across the chambers A and B inside of the cylinder tube divided by the piston 8, a valve means 12 is provided, and on the side of the circulating path 9 connected to the chamber B and on the side thereof connected to the chamber A, an accumulator 10 for storing one part of the pressurized fluid and another accumulator 11 for reducing pressure inside of the chamber A are provided respectively. A check valve C is also provided in a part of the path connected between the two accumulators 10 and 11 so that the flow of the pressurized fluid from the accumulator 10 to the accumulator 11 is thereby prevented.

A device 13 for opening or closing the metal mold 5 and a hydraulic cylinder 17 for clamping the metal mold 5 at a strong pressure at a position where the material of, for instance, a plastic resin is injected inside of the metal molds, are both provided in one of the supporting members 101 fixed to the base structure 100. To be more specific, the positions for the two devices 13 and 17 are determined along a locus of pistons 8 moving around the center of the rotating shaft 3 and at the locations opposing to a coupling member 14 integral with a rod 15 of the mold opening-and-closing device 13 and also to a mold clamping ram 18, respectively. The above mentioned injection nozzle of the injecting device 19 of, for instance, plastic material is located at a position on the stationary supporting member 102 opposing to the mold clamping ram 18.

Around the coupling member 14 of the mold opening-and-closing device 13, a holding member 16 for receiving the flange portion of the pressurizing cylinder 6 is provided, and the piston 8 included in the pressurizing cylinder 6 is operated under a condition wherein the pressurizing cylinder 6 is supported by the holding member 16.

Figure 5:
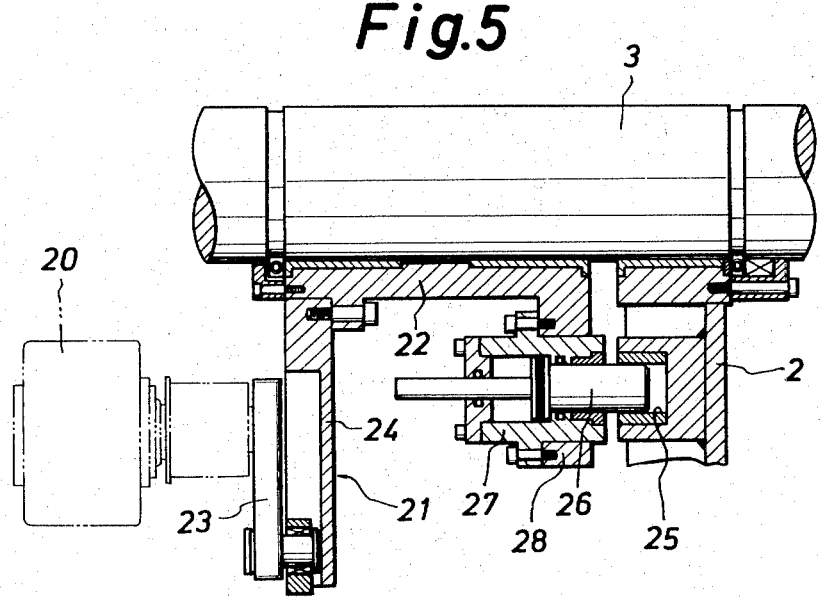
FIG. 5 is a profile view, partly in section, showing the interconnection between the reciprocal movement device and a rotating plate.
Figure 6:
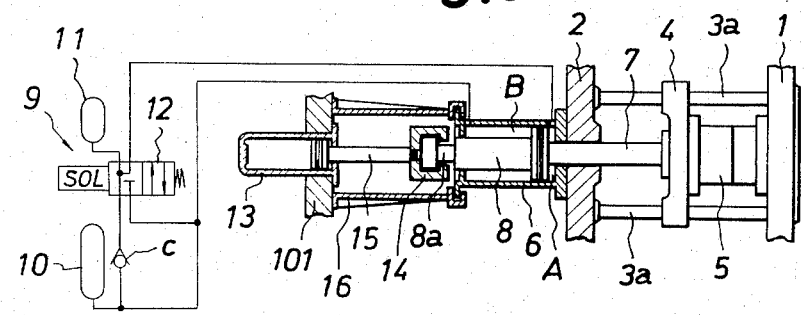
FIGS. 6 through 8 are views showing various stages of the operation of the metal mold.

A device for rotating the plates 1 and 2 comprises a hydraulic motor 20 fixed to the supporting member 101 and a reciprocal movement device 21 driven by the hydraulic motor 20. The hydraulic motor 20 is so constructed that it may be swung around in a predetermined angular range, and the reciprocal movement device 21 comprises a sleeve 22 freely swingably inserted between the stationary supporting member 101 and the rotating plate 2, the under side of the sleeve 22 being formed into a link 24 engaging with a crank 23 mounted on the driving shaft of the hydraulic motor 20, and a locking device comprising an arm 28 also projected downwardly from the sleeve 22 and mounting a hydraulic device 27 including a ram 26 to be inserted into one of locking holes 25 provided on the rear side of the rotating plate 2 spaced apart at a predetermined distance (see FIG. 5).

Figure 4:
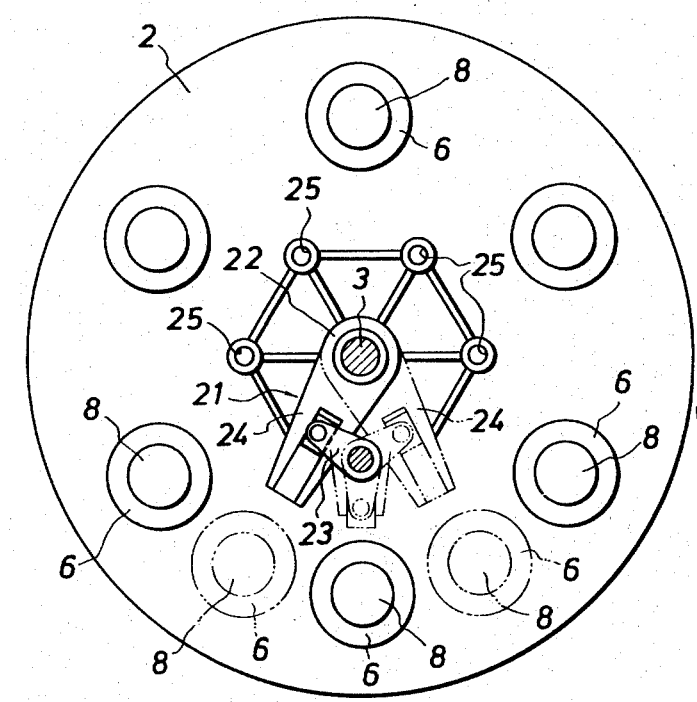
FIG. 4 is a rear side view of the injection molding machine to indicate a reciprocal movement deivce attached thereto.

When it is desired to rotate the rotating plates 1 and by means of the rotating device, the hydraulic motor 20 is operated to rotate the crank 23, for instance, in a clockwise direction. Under the cooperation of the crank 23 and the link 24, the arm 28 is moved to a position, for instance, shown by the full lines in FIG. 4 aligning with one of the locking holes 25. At this position, the hydraulic device 27 is operated and the ram 28 is inserted into the locking hole 25 now aligning with the locking device. Thus the reciprocal movement device 21 is coupled with the rotating plates 1 and 2. The hydraulic motor 20 is thereafter rotated in the counterclockwise direction to the position shown by the chain lines in FIG. 4, so that the whole of the rotating plates 1 and 2 mounting the die plates 4, mold open-or-closing rods 7, pressurizing cylinders 6, and pistons 8 included therein are rotated by one step. The rotating plates 1 and 2 and others may be rotated intermittently as described above when the locking device and the reciproval movement device 21 are repeated their operations as described above.

Figure 7:
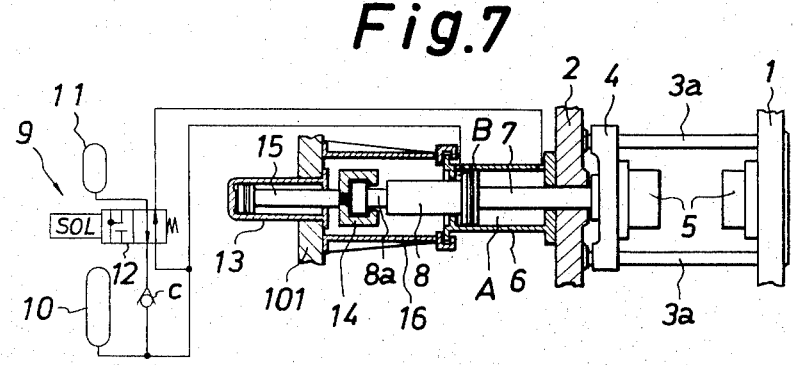
Figure 8:
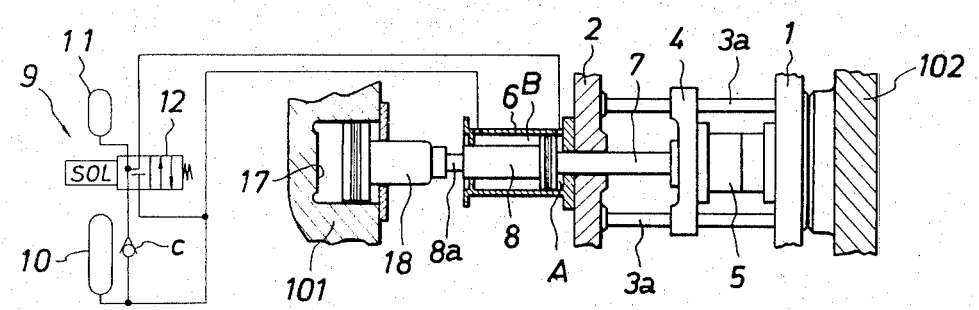

In each step of the intermitted rotation of the rotating plates 1 and 2, the metal mold coming into alignment with the injection nozzle of the injection device 19 is injected with a plastic material. When the thus injected metal mold in a pressurized condition as shown in FIG. 2 is desired to be opened, the metal mold 5 must be sent to the position aligning with the mold opening-and-closing device 13 and the neck portion 8a at the rear end of the piston 8 must be inserted into the coupling member 14 of the device 13. Then the valve means 12 is transferred to the open position so that the pressureized fluid in the chamber B in the pressurizing cylinder 6 can be passed back to the chamber A as shown in FIG. 7, and thereafter the mold opening-and-closing device 13 is operated to draw out the piston 8 forcibly. Simultaneous with the movement of the piston 8, the pressurized fluid in the chamber B is sent back to the chamber A through the circulating path 9, and an amount thereof in short because of the difference in the diameters of the pistons 7 and 8 is supplied from the accumulators 10 and 11 automatically. As a result, the metal mold 5 is opened by means of the die plate 4 connected integrally with the rod 7.

When the metal mold is opened as described above and the product formed inside of the metal mold is removed, the mold opening-and-closing device 13 is operated in the reverse direction with the valve means 12 left as it is, so that the piston 8 and the rod 7 are advanced forwardly to the metal mold 5 to close the same. In accordance with the movement of the piston 8, the pressurized fluid in the chamber A of the cylinder 6 is circulated back to the chamber B, and an excessive amount of the pressurized fluid is stored in the accumulator 10. At this time, the fluid pressures at both sides of the piston head are equalized. In this condition, since there is no pressure difference between these chambers and the circuit interconnecting these chambers is also at the opened state, the piston 8 may be moved backwardly when the metal mold 5 is rotated on the rotating plates 1 and 2 away from the mold opening-and-closing device 13, and the metal mold 5 may be automatically opened under an outer force caused by, for instance, vibration.

In order to prevent the above described free opening of the metal mold 5, a hydraulic resistance must be provided for the movement of the piston 8. The provision of the hydraulic resistance can be carried out very easily by transferring the valve means 12 to a state of "cylinder port one block". In this state, the pressurized fluid in the chamber B is blocked from circulating into the chamber A, and the fluid in the chamber A is reduced its pressure because of its flowing into the accumulator 11. As a result, a pressure difference is caused across the piston head, and the pressure applied at the left side of the piston head acts as a resistance for preventing the movement of the piston 8 caused by an outward force, and the metal mold 5 is maintained at the clamped state. The metal mold thus closed is thereafter sent to a forced clamping device including a forcible clamping ram 18 to abut the end of the piston 8, and the plastic material is injected inside of the metal mold 5. After the injection, the metal mold 5 is maintained to the pressurized and cooling state on the rotating plates 1 and 2, until the metal mold 5 is again brought back to the mold opening-and-closing device 13, and at the latter device 13, the metal mold 5 is opened again as described before. Herein, it should be noted that the metal mold cannot be opened so far as the valve means are not transferred to the opened state, and for this reason, the automatic opening of the metal mold before it is brought back to the mold opening position is thereby prevented.

According to the present invention, since the metal mold is maintained to the self-closing state by means of the pressurizing cylinder 6, the metal mold is always kept in the closed state even after it is removed from the mold opening-and-closing device, and the opening of the metal mold 5 is made impossible unless the hydraulic pressure in the pressurizing cylinder is removed. For this reason, the metal mold can withstand the inner pressure caused by the injection of the plastic material and is maintained at a pressurized state as long as such a condition is required. Furthermore, the construction of the invention is very simple because it requires merely a pressurizing cylinder having a piston integrally coupled to the mold operating rod and accumulators and valve means interconnected to the pressurizing cylinder. When this invention is compared with the conventional devices of this kind, it will be apparent that various members such as coil springs and clamping members may be omitted from the metal mold, and far simpler and rugged construction of the metal mold and its associated devices can be thereby obtained.

In FIGS. 9 through 14, there is indicated another embodiment of the present invention wherein the mold pressurizing device is made far simpler than the above described embodiment of the invention. In this example, the rotating plate 2 is provided with a pressurizing cylinder 6 on the rear side of the rotating plate 2, and the mold operating rod 7 integrally coupled with the piston 8 included in the pressurizing cylinder 6 is passed through the rotating plate 2 to be connected with the die plate 4. Furthermore, inside of an end portion of the piston 8 having a flange 8b, a pressure reducing cylinder 31 is provided in such a manner that the cylinder 31 is communicated through a passage 30 with a chamber A divided inside of the cylinder tube by means of the piston head, and inside of the pressure reducing cylinder 31, there is provided a small piston 33 having a piston rod 32 projected through an end wall of the cylinder 31.

In addition, a circulating path 9 for the fluid driven by the piston 8 moved inside of the pressurizing cylinder 6 is provided on the pressurizing cylinder 6. Within the path 9 between the chamber A and chamber B of this cylinder 6, there is provided valve means 12, and on the circuit connected to the chamber B, an accumulator 10 for storing one part of the pressurized fluid is provided.

Figure 9:
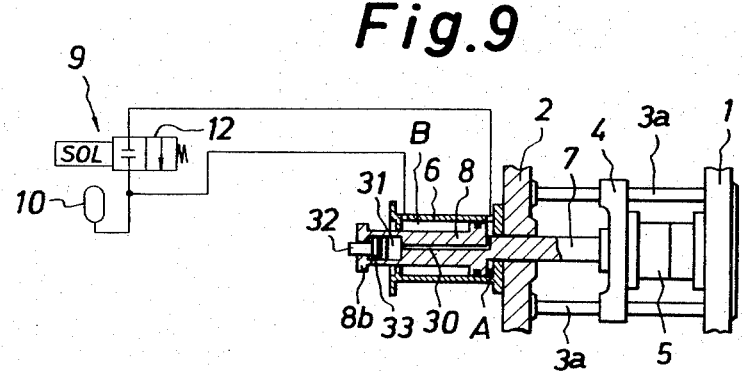
FIG. 9 is a profile view, partly in section, of another example of the device for pressurizing the metal molds in this injection molding machine.
Figure 10:
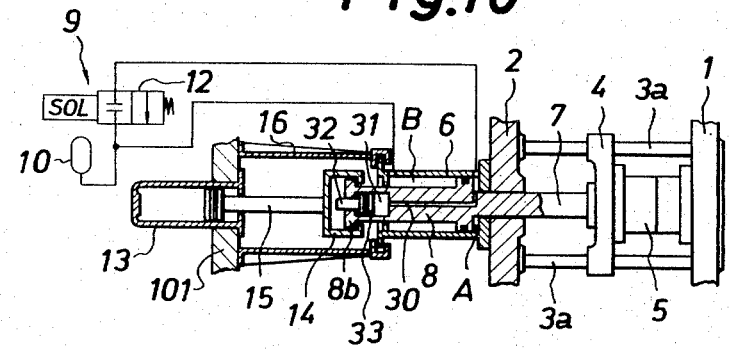
FIGS. 10 through 14 are views showing various stages of the operation of the metal mold in this embodiment of the invention.
Figure 11:
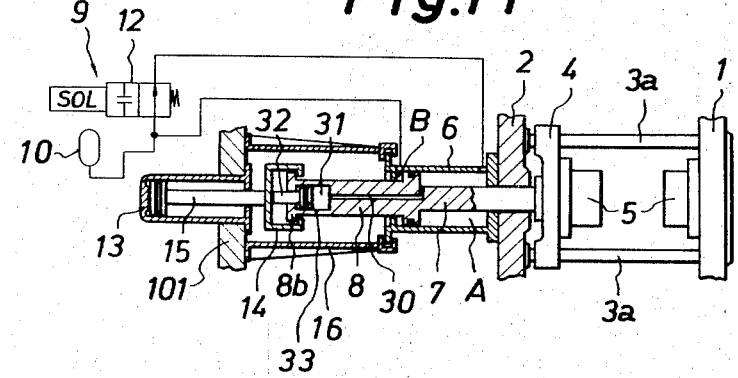

The operation of this embodiment of the invention will now be described. When the metal mold 5 closed and maintained to the pressurized condition as shown in FIG. 9 is desired to be opened, the metal mold 5 is brought on the rotating plates 1, 2 to the position of the mold opening-and-closing device 13, so that the flange 8b at an end of the piston 8 and the piston rod 32 of the piston 33 in the pressure reducing cylinder 31 are both inserted into the coupling member 14 of the mold opening-and-closing device 13. The valve means 12 is operated as shown in FIG. 11 so that the path 9 of the fluid is thereby brought into the opened state, and simultaneously the mold opening-and-closing device 13 is hydraulically operated to pull out the operating rod 7 and the piston 8 so that the metal mold 5 is thereby opened. Because of the movement of the piston 8, the operational fluid in the chamber B of the cylinder tube if passed through the circulating path 9 to the chamber A of the same cylinder tube, and an amount of the fluid in short because of the difference in the diameters of the operating rod 7 and the piston 8 is automatically supplied from the accumulator 10.

Figure 12:
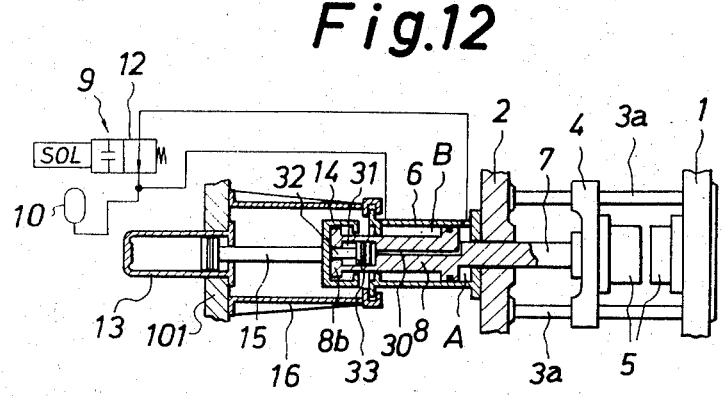

After the metal mold is thus opened and the product is removed from the metal mold, the mold opening-and-closing device 13 is operated in just the reverse direction with the fluid circulating path 9 being left as it was, so that the piston rod 15 of the device 13 is extracted forwardly. As a result, the rod 32 of the piston 33 in the pressure reducing cylinder 31 is at first pushed into the cylinder 31 before the end surface of the piston 8 abuts the bottom plate of the coupling member 14, and the pressurized fluid inside of the pressure reducing cylinder 31 is pushed out of the cylinder 31 to the chamber A through the passage 30. When the rod 15 of the device 13 is further extracted, the piston 8 is moved forwardly with the fluid in the chamber A being circulated back into the chamber B of the pressurizing cylinder 6 through the circulating path 9, and the metal mold 5 is thereby closed as shown in FIG. 12. In this case, an excessive amount of the pressurized fluid is stored in the accumulator 10. Since the fluid pressure in the chamber A is not reduced in this connection, the fluid pressures at both sides of the piston head are substantially equal, and when it is required that the metal mold 5 is maintained in the pressurized closed condition, the fluid pressure in the chamber A must be reduced by any means to a lower value than that of the chamber B. This can be achieved automatically by a simple manipulation of the mold opening-and-closing device 13.

Figure 13:
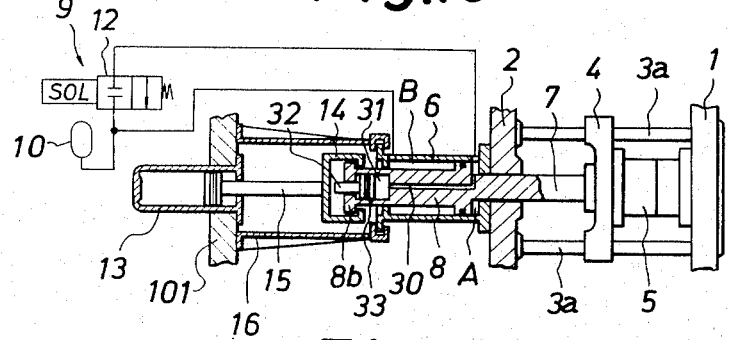
Figure 14:
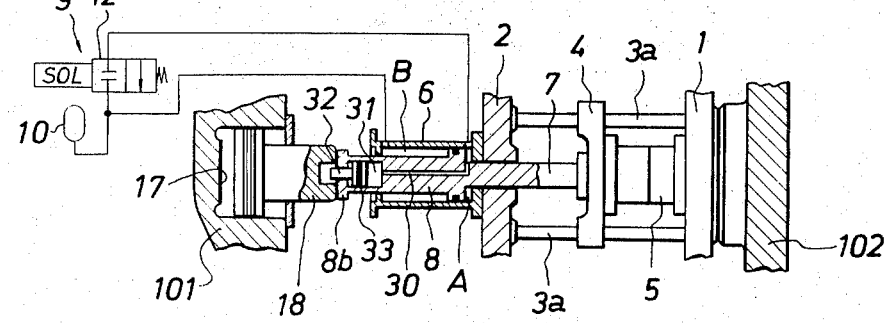

More specifically, when the condition shown in FIG. 12 is attained, the valve means 13 is transferred as shown in FIG. 13 so that the circulating path 9 of the operating fluid is thereby blocked. Then, the rod 15 of the mold opening-and-closing device 13 is slightly retracted until the rod 32 of the pressure reducing piston 33 having been pushed into the pressure reducing cylinder 31 by the bottom wall of the coupling member 14 is retracted back to the initial position. Retraction of the rod 32 of the piston 33 reduces the inner pressure of the pressure reducing cylinder 31 whereby the inner pressure of the chamber A is reduced. As a result, the piston 8 is automatically urged toward the forward end of the cylinder 6 under the action of the fluid pressure in the chamber B which is constantly supplied from the accumulator 10, and the metal mold 5 is thereby completely closed and maintained under the pressurized condition. Since the fluid pressure in the chamber B is kept constant as long as the valve means 12 is maintained to the blocking position, there is no possibility of the piston 8 being automatically retracted from the closed position although the metal mold 5 is thereafter transported on the rotating plates 1, 2 to the injecting position, and the metal mold can be subjected to the strong clamping action of the forcible clamping device. That is, the mold clamping ram 18 of the mold clamping device is caused to abut the end surface of the piston 8, and the metal mold 5 is thereby forcibly clamped. The metal mold 5 is then subjected to an injection step of, for instance, a plastic material.

When the molding of the plastic is completed, the metal mold 5 is transported to cooling and pressurized positions while the metal mold 5 is kept in the state as shown in FIG. 9, and is finally transported back into the mold opening-and-closing position as described before. At this position, the metal mold 5 is opened and the product in the metal mold is removed from the metal mold.

In this embodiment of the invention, since a pressure reducing cylinder and a pressure reducing piston are provided in the end portion of the piston 8 in such a manner that these are operable by the mold opening-and-closing device, the fluid pressure inside of a fluid chamber located at the forward side of the mold pressurizing cylinder can be reduced at the ultimate stage of the mold closing step, the number of the accumulators in the fluid circulating path provided on the pressurizing cylinder can be reduced to one, and the check valve in the circulating path can also be omitted. As a result, the construction of the circulating path of the fluid can be substantially simplified in comparison with the previous embodiment having a pressure reducing accumulator, and the installation thereof onto the pressurizing cylinder is thereby much facilitated.

Although the invention has been disclosed with respect to rotary type injection molding machines which can be rotated around a horizontally extended shaft, it is apparent that the invention may also be applied to those machines rotatable around a vertically disposed shaft. Thus, it should be noted that the attached drawings are indicated only for the explanatory purpose and the invention is by no means limited by these drawings.

I claim:
1. In a rotary type injection molding machine having a mold pressuring device:
   A. a pair of rotatable plates which are disposed in fixed parallel planes and can be rotated in the vertical planes intermittently around a horizontal supporting shaft mounted on a base structure of the injection molding machine;
   B. a plurality of die plates with operating rods arranged between said pair of rotatable plates and around said supporting shaft in a radially spaced apart relationship with the die plates being movable freely on and between said pair of rotatable plates;
   C. a plurality of mateable mold halves, respectively mounted on one said rotatable plate and on said die plates;
   D. pressurizing cylinders of the same number as that of the die plates attached on the rear side of one of said rotatable plates at positions aligning with said die plates;
   E. each of said pressurizing cylinders having a piston rod extended forwardly to penetrate said one of the rotatable plates and connected integrally to a said operating rod of said die plate;
   F. each of said pressurizing cylinders having a fluid circulating path provided with one accumulator for reducing fluid pressure in one of said fluid chambers in said pressurizing cylinder, a check valve inserted in a part of the fluid path between said two accumulators, and transfer valve means inserted in said fluid path between the fluid chambers in each of said pressurizing cylinders;
   G. separate accumulator and valve means being severally mounted in operative connection with each said mold pressurizing cylinder fixedly attached on said one said plate;
   H. a pair of stationary members fixed to said base structure and mounting said supporting shaft;
   I. a device for intermittently rotating the rotatable plates;
   J. a mold opening-and-closing device which opens or closes the metal mold by movement of a said mold half on a said die plate by means of the mold operating rod which is connected to the piston in the mold pressurizing cylinder and also to the die plate;
   K. a hydraulic device for strongly clamping the metal mold halves together through said piston and die plate;
   L. said opening and closing and clamping devices being all disposed on said stationary members mounting said pressurizing cylinders; and
   M. an injecting device located in the lower portion of the other stationary member at a position opposing said mold clamping device.

2. A machine as claimed in claim 1 wherein said device for intermittently rotating the rotatable plates comprises: a hydraulic motor provided on one said stationary member for swingably driving a crank within a predetermined angle, a reciprocal movement device including a sleeve freely movably slipped over said shaft supporting said rotatable plates at a portion thereof located between the stationary member and one of the rotatable plates, said sleeve having a portion formed into a link interconnected with said crank, and a hydraulic device disposed on said link and having a ram movable to be inserted into one of a plurality of holes provided in one of said rotatable plates at a predetermined distance.

* * * * *